(12) United States Patent
Delrahim et al.

(10) Patent No.: US 9,145,783 B2
(45) Date of Patent: Sep. 29, 2015

(54) SEAL GAS MONITORING AND CONTROL SYSTEM

(76) Inventors: Joe Delrahim, Deerfield, IL (US); Paul A. Hosking, Kildeer, IL (US)

(*) Notice: Subject to any disclaimer, the term of this patent is extended or adjusted under 35 U.S.C. 154(b) by 478 days.

(21) Appl. No.: 13/564,374

(22) Filed: Aug. 1, 2012

(65) Prior Publication Data

US 2013/0031960 A1 Feb. 7, 2013

Related U.S. Application Data

(60) Provisional application No. 61/514,732, filed on Aug. 3, 2011.

(51) Int. Cl.
*G01N 7/00* (2006.01)
*F01D 11/00* (2006.01)
*F25B 49/00* (2006.01)
*F01D 11/06* (2006.01)

(52) U.S. Cl.
CPC .............. *F01D 11/00* (2013.01); *F01D 11/06* (2013.01); *F25B 49/00* (2013.01)

(58) Field of Classification Search
CPC .................................. G01M 3/14; G01N 7/00
USPC ....... 73/40.5 R, 756, 714, 23.2, 25.01, 25.04, 73/25.05, 28.01, 28.03, 29.01, 335.06, 73/29.03, 29.05, 30.01, 30.02, 30.04, 73/31.05; 415/26, 47, 110–112; 277/317–319, 321
See application file for complete search history.

(56) References Cited

U.S. PATENT DOCUMENTS

| | | | | |
|---|---|---|---|---|
| 5,291,032 A | * | 3/1994 | Vali et al. | 250/577 |
| 5,700,013 A | * | 12/1997 | Baty | 277/340 |
| 5,713,576 A | * | 2/1998 | Wasser et al. | 277/304 |
| 6,345,954 B1 | | 2/2002 | Al-Himyary | |
| 6,394,764 B1 | * | 5/2002 | Samurin | 417/313 |
| 6,626,436 B2 | * | 9/2003 | Pecht et al. | 277/317 |
| 6,715,985 B2 | * | 4/2004 | Delrahim et al. | 415/26 |
| 7,854,584 B2 | * | 12/2010 | Lusted et al. | 415/111 |
| 2009/0290971 A1 | * | 11/2009 | Shamseldin et al. | 415/1 |

OTHER PUBLICATIONS

USPTO, International Search Report in International Patent Application No. PCT/US2012/049196 (Oct. 9, 2012).
USPTO, Written Opinion in International Patent Application No. PCT/US2012/049196 (Oct. 9, 2012).

* cited by examiner

*Primary Examiner* — Hezrone E Williams
*Assistant Examiner* — Hoang Nguyen
(74) *Attorney, Agent, or Firm* — Leydig, Voit & Mayer, Ltd.

(57) ABSTRACT

A monitoring and control system for a seal gas supply system for a non-contacting gas seal. The supply includes several gas conditioning elements or units. The monitoring and control system includes an evanescent wave sensor to sense the presence of liquid in the seal gas. Multiple sensors to sense the temperature and pressure of the treated seal gas are disposed at the outlet of the conditioning elements. A programmable logic device is provided with information regarding the phase of the gas at various pressures and temperatures and compares the sensed data to the baseline data. Recognition of liquid concentrate results in an output signal.

5 Claims, 3 Drawing Sheets

SEAL GAS MONITORING AND CONTROL SYSTEM

CROSS REFERENCE TO RELATED APPLICATIONS

This application claims priority pursuant to Title 35 U.S.C. §19(e) to U.S. Provisional Application Ser. No. 61/514,732, filed Aug. 3, 2011 and entitled "Seal Gas Monitoring and Control System", the entire specification and drawings of which are incorporated herein by reference as if fully set forth herein.

BACKGROUND

This disclosure relates to gas conditioning systems for non-contacting gas seals. More particularly, it relates to a system for monitoring and control of seal buffer gas.

Non-contacting seals for gas compressors and other rotating equipment such as gas and steam turbines, turbo expanders, centrifugal pumps and the like, operate on a thin film of conditioned process gas; pre-treated to render it suitable for delivery to, and passage through, the seal mechanism. Commonly, the source of this seal gas, sometimes called buffer gas, is the machine discharge.

The principle of dry gas seal technology is that the sealing faces are non-contacting and a clean and dry gas is allowed to pass through the seal interface. It flows from the high pressure side of the seal to the low pressure seal and is routed to a flare line through the primary vent outlet module which comprises monitoring instruments and a safety trip to shut down the compressor in the event of high seal leakage. Typically abnormal seal gas leakage has represented the sole measure of seal performance.

Seal gas, that is the gas upon which the non-contacting seal operates, is process gas usually from the discharge line of the compressor unit, piped to the control system supply line. The control system then regulates and filters the buffer gas flow before it is injected to the primary seal chamber. The pressure and leakage flow rate are monitored and recorded to ensure that the seals function properly.

A known cause of seal failure is a lack of clean and dry seal or buffer gas being supplied to the compressor. Critical to gas seal longevity, seal gas must be free of liquid vapor or condensate. Liquid contamination has been found to be a leading cause of the failures. Particular applications prone to liquid contamination were mostly found on offshore platforms, Hydrogen Recycle, Gas Gathering, Ammonia, HP pipelines and similar seal applications. Initial gas composition information is often unreliable, and changes with time, resulting in failures due to liquid condensation.

Attention to reliability and damage prevention is particularly critical because of the requirements of high-pressure compressors used in exploration, such as gas reinjection and the complexity of gas compositions involved. Unexpected seal failures cause operational loss and delay in start-up.

Also, initial system selection often sabotages optimal reliability. Compressor manufacturers often do not review the make-up of the process fluid, including gas composition, operating pressure and temperature, liquid and contaminate level in the process gas, and the auxiliary buffer gas requirement. Additionally, current systems do not offer an advanced warning or initiate corrective action to prevent exposure to free liquid or condensate, which it is considered to be a major root cause of failures. The current method of seal health evaluation based on leakage volume is insufficient. And, failures are costly because of the delay in plant start-up and loss of production.

As compressor operating requirements push past current limits, there is a clear need for innovative and intelligent approaches to support the emerging compressor markets.

One way to improve the reliability of these new designs is to integrate such seals with imaginative control system technology. Achieving optimum reliability is assured by providing appropriate control system technology to ensure that clean and dry buffer gas is always available to the non-contacting faces of the seal.

Prior efforts to monitor seal gas have focused on recognition of conditions within the seal chamber containing the non-contacting seal devices. One example is disclosed in U.S. application for patent Ser. No. 12/469,045 filed May 20, 2009 (Publication US2009/0290971) the entire specification and drawings of which are hereby incorporated by reference herein as if fully set forth.

SUMMARY OF THE DISCLOSURE

The system of this disclosure is intended to eliminate the liquid condensate from the seal environment, thereby avoiding the leading cause of seal failures. It may also provide a warning or correction to ensure that liquid fluid does not reach the seal chambers.

In this regard, the system is arranged to detect liquid contaminant in the seal gas supply conduit prior to reaching the seal chamber. It comprises monitoring and control system for a seal gas supply system for a non-contacting gas seal that is responsive to liquid, vapor or condensate, in the seal gas supply flow. The supply system includes a supply conduit connecting several gas conditioning elements. The monitoring and control system includes an evanescent wave sensor in the conduit to sense the presence of liquid in the seal gas. Additionally, multiple sensors to sense the temperature and pressure of the treated seal gas are disposed along the conduit at the outlet of the conditioning elements. A programmable logic device communicates with the sensors and is responsive to recognition of liquid in the conduit. It is provided with stored information regarding the phase of the gas at various pressures and temperatures and makes a comparison to the sensed data. Recognition of a liquid phase results in an output signal, or action.

DETAILED DESCRIPTION

Figure 1:
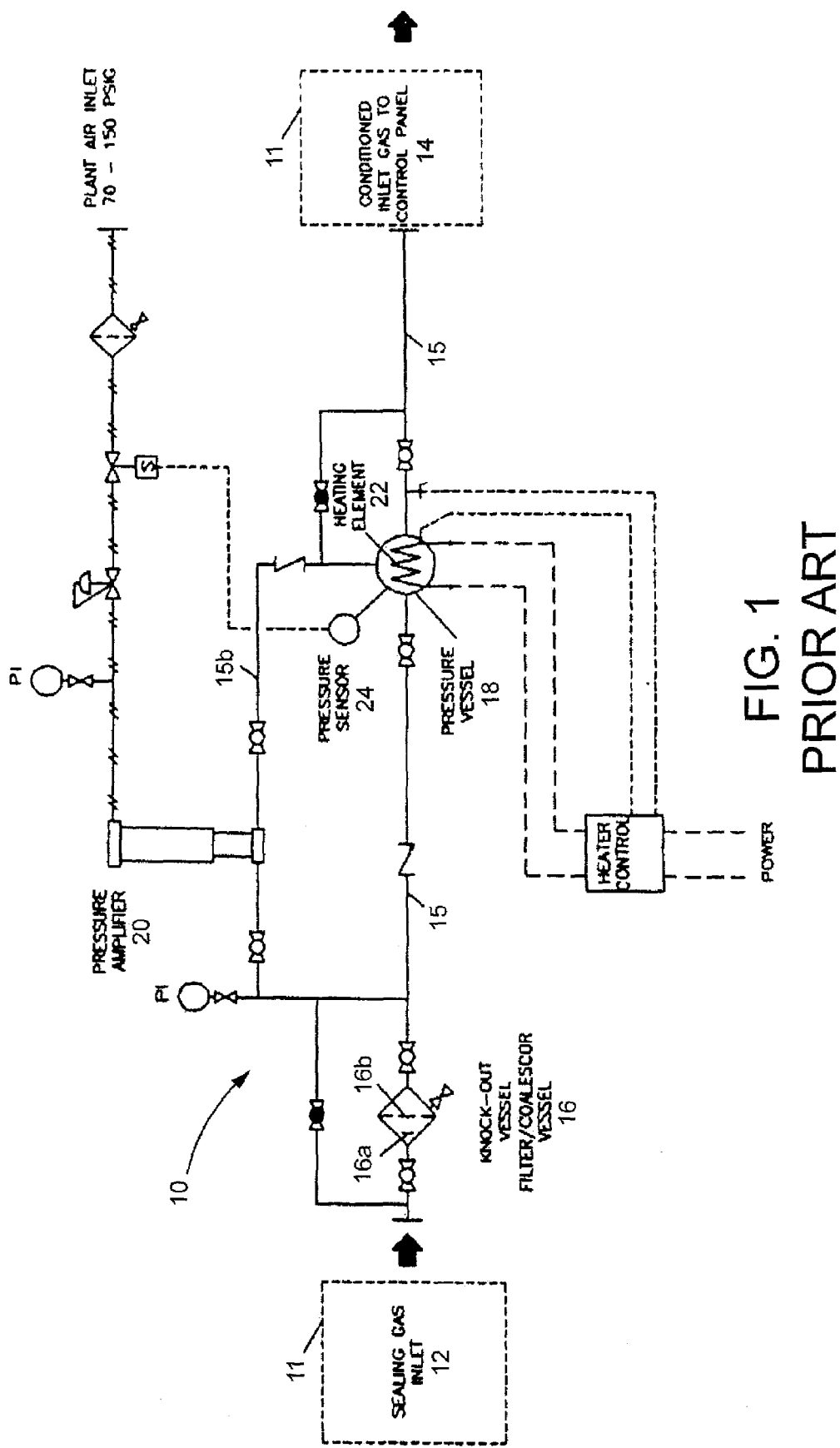
FIG. 1 is a schematic of a typical gas conditioning system for pre-treatment of a non-contacting seal buffer seal gas supply.

Commonly, seal gas conditioning consists of three functions—filtration, pressure or flow regulation, and leakage monitoring.

Filtration: In early designs, filtration consisted of simple duplex filters—one active filter and another on standby. A simple valve would reposition each filter to facilitate the filter element replacement. A supply gas line from the discharge side of the compressor then fed the warm discharge gas to the filter. The coalescent or particulate type gas filters used in this application are not always effective to completely purge liquid and condensate from the seal gas stream.

Pressure or Flow Regulation: The warm gas from the filter is pushed across a pressure regulator or flow control valves to supply clean buffer gas to the seal environment. The buffer gas pressure is normally lower than the discharge pressure, and must be higher that the compressor's suction pressure. By reducing the buffer gas pressure across the regulator valve, the gas expands and cools down, and has a tendency to drop liquid, depending upon its composition. Subsequently, this pressure-reducing device, used to reduce the gas pressure from the discharge side of the unit, may function as a source for injecting saturated buffer gas to the sealing port.

Leakage Monitoring: The outboard and inboard seal leakage rates are measured as a way to establish the seal's condition and performance. Normally, a leakage flow rate at or above a set primary seal leakage rate indicates primary seal malfunction. A primary seal leakage flow rate below a set point indicates excessive secondary seal leakage.

This basic type of dry gas seal gas conditioning system works fine if the process fluid is clean and free of any liquid condensate in all operating conditions. One consideration often overlooked is the make-up of the intended process fluid, including gas composition, operating pressure and temperature, liquid and contaminant level in the process, and the auxiliary buffer gas requirement. Additionally, the typical dry gas seal gas supply system does not offer an advanced warning or initiate corrective action to prevent dry gas seal exposure to free liquid or condensate.

Generally, gas composition supplied at the compressor's suction side remains unchanged unless there is a major plant process upset during operation when plant equipment, such as scrubbers or coolers, malfunctions. The conditions of the buffer gas supplied to the dry gas system from unit discharge or auxiliary gas change, however, because of fluctuating fluid pressure or temperature throughout the gas stream before buffer gas is injected to the dry gas seal chamber of each seal. This change may be the result of gas expansion across the regulator valves, restriction across the filter elements or environmental conditions.

A conditioning system for gas compressor seals is disclosed in U.S. Pat. No. 6,715,985 issued Apr. 6, 2004, entitled "Gas Conditioning System." It is illustrative of a successful arrangement for pre-treatment of seal buffer gas prior to delivery to the seal chamber for passage through the operating non-contacting seals.

Referring to FIG. 1, there is illustrated a gas conditioning system as described in U.S. Pat. No. 6,715,985 for seal gas delivered to a non-contacting gas seal. The system generally designated 10, including individual components discussed below, may be unitized as a single package on a movable skid. It may be positioned in association with an existing rotary device equipped with one or more gas lubricated non-contacting seals, or it may be part of an installation of new equipment where gas lubricated, non-contacting seals are to be used.

Connection of the system 10 to the equipment in which the seals are used may occur through suitable ports in a gas control panel shown schematically. Such control panels are typically located adjacent the rotary equipment being sealed and contain valves and gauges that reflect seal operation. It is contemplated that the system may be incorporated with a gas panel as a single unitized module.

As seen in FIG. 1, the system 10 includes a connection or inlet 12 to piping defining a conduit 15 to deliver the received process gas through the conditioning elements and to the seal chambers defined by the compressor housing. The inlet is connected to a source of gas for supply to the seal chamber or chamber in which there is disposed a gas lubricated, non-contacting gas seal. As is known in the art, this source may typically be the discharge end of a gas compressor in which the seals are employed.

The system 10 includes a connection or outlet 14 to piping adapted to be placed in communication with a seal chamber within the device. Such connection may communicate with one or more seal chambers depending on the number of seals employed in the device.

The major conditioning elements of the system of the present invention are elements to remove solid and liquid particulate matter and aerosols from the gas, and to heat or amplify pressure of the gas when necessary. There is illustrated a knock-out filter/coalescer vessel 16, a pressure vessel 18, a gas heating element 22 and a pressure amplifier 20. These components are connected in fluid communication by piping or conduit, generally designated 15, that defines a flow path between the gas supply connection 12 and the connection 14 to the seal chamber.

The knock-out filter-coalescer vessel 16 is a device that removes particulate matter and liquid droplets from the gas flowing through the system. It includes a baffle plate designated to remove solid particulate and free liquid contained in the seal gas. This separated contamination settles at the bottom of the vessel 16 and is removable, either manually, or by an automated arrangement.

The seal gas is then further conditioned by purging it of entrapped liquid aerosols by the coalescing action of a filter element. The knock-out plate and coalescing filter are known devices. Also, a centrifuge-type device could be employed in place of the knock-out plate. In such an arrangement, two separate vessels, one for the centrifuge, the other for the filter element, would make up the conditioning element 16.

The pressure vessel 18 is a tank capable of maintaining gas under system pressure. Its volume is determined by the expected requirements of the seal in the seal chamber and labyrinth leakage rate. A suitable size is calculated for the particular application involved.

The heating element 22 is disposed within pressure vessel 18.

The compression cylinder of the gas pressure amplifier or intensifier 20 is in communication with the line 15($b$) as part of the flow path to pressure vessel 18. The piston in the compression cylinder pressurizes the seal gas in the system for delivery to the pressure vessel 18.

The above described system provides a liquid knockout before filtration, and insulation and heat to avoid liquid condensate formation in the buffer gas. Although this approach helps to reduce the liquid condensate, it may not be effective for emerging applications, such as ultra-high-pressure reinjection compressors, that employ heavy hydrocarbon as part of their gas compositions, and in applications where the only source of buffer gas is from the high-temperature discharge side of the compressor. In certain applications, for example, gas reinjection compressors utilized in oil recovery, this discharge pressure could be as high as 10,000 pounds per square inch (psi).

The system described above may be suitable for the majority of applications. However, failures may still occur because of a lack of available clean and dry buffer gas. This is a major issue for current dry gas seal control systems and there is no warning in advance of any changes in conditions that could result in forming or exposing the dry gas seal to liquid.

Additionally, the gas analysis provided to the manufacturer to determine the dew point suitability of buffer gas and need for buffer gas conditioning is based on a limited gas analysis, typically up to Octane (C8) or less. The gas analysis of up to C12 may be required for manufacturer to be able to size the proper system to achieve a more suitable buffer gas and avoid liquid drop out across the sealing faces.

With the goal of improving dry gas seal reliability further, a new approach to buffer gas conditioning is disclosed here. It is suitable for all applications, but particularly suitable for applications, such as wet gas, or any projects where liquid or condensate may form because of operating environment changes. The arrangement of the present disclosure will also recognize malfunction of a gas conditioning element of the system and provide a suitable signal, alert, or automatic response.

Figure 2:
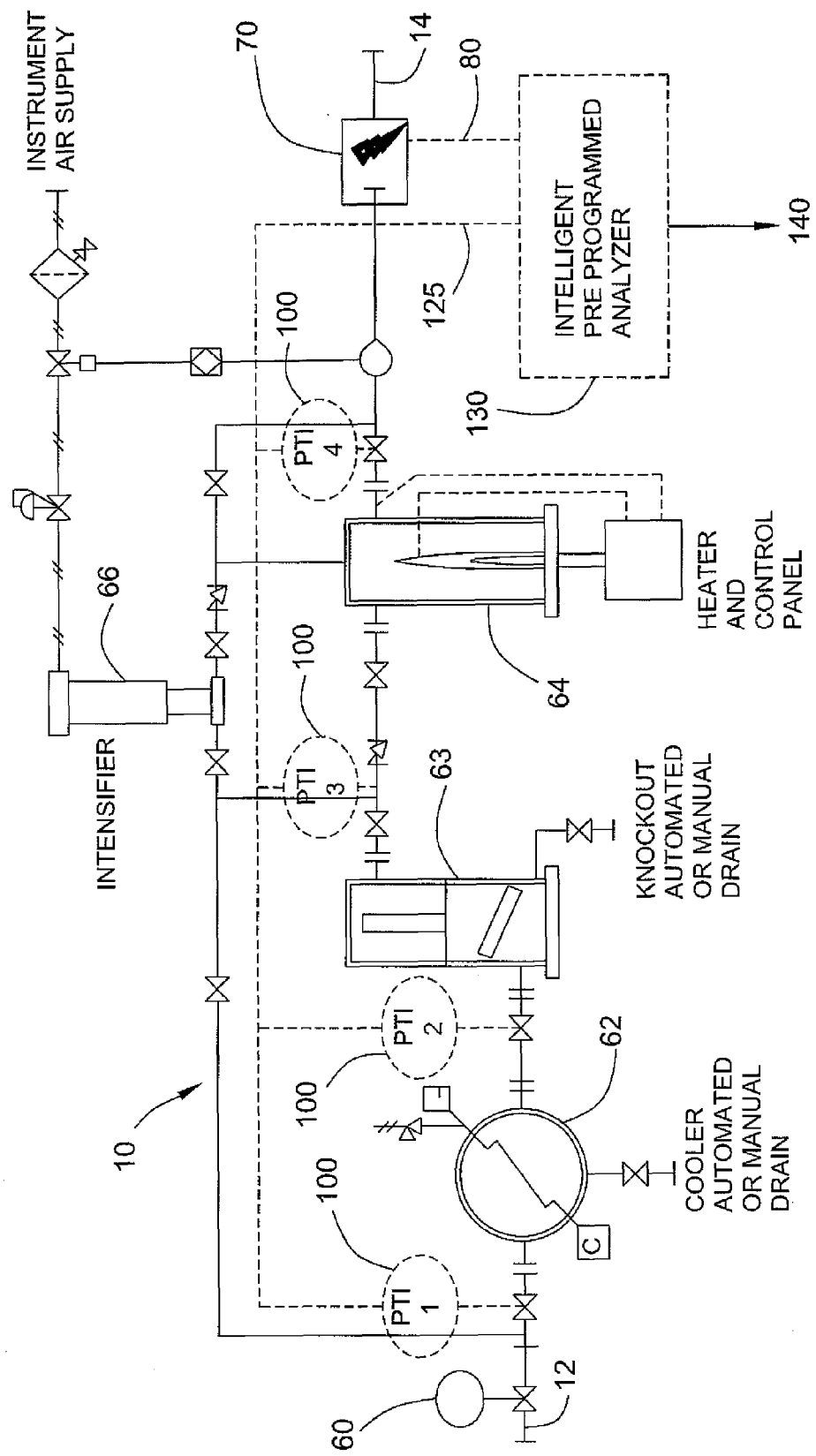
FIG. 2 is a schematic of the seal gas monitoring and control system of the present disclosure.

The monitoring and control system of the present disclosure is expected to be suitable for application to a gas compressor capable of gas discharge pressures of up to 10,000 psi or higher. The disclosed system, as seen in FIG. 2, commences at a pressure regulator 60 interposed between the source of process gas 12 and the gas conditioning system 10. Gas from the conditioning system 10 is delivered to the seal chambers of an associated device such as a gas compressor through conditioned gas outlet 14.

As compressor operating requirements push past current limits, there is a clear need for innovative and intelligent approaches to support the emerging compressor markets. This approach's main goals are to eliminate the liquid condensate, which is the leading cause of seal failures from the buffer gas stream, and also provide a warning or correction to ensure that liquid fluid does not reach the sealing chambers.

The monitoring and control system of the present disclosure is described below. It is illustrated in relation to a typical, though not exclusive, seal gas conditioning system. In general terms, and with reference to FIG. 2, the monitoring and control system includes one or more of the elements described below.

Pressure Regulator: Referring to FIG. 2, a pressure regulator 60 is installed at the source 12 of process gas for supply to the seal chamber. The regulator is at the inlet connection 12 for the conditioning system piping or conduit 15. It receives process gas from the associated compressor for delivery through the system to the gas seal chambers. It reduces the supplied warm buffer gas pressure, which results from discharge or auxiliary gas, to a manageable and recommended sealing pressure for use in the gas seals. This is particularly critical in high- or ultra-high-pressure applications where there is a large disparity between the compressor's suction and discharge pressures. Based on gas mixture compositions, liquid condensate may form when there are changes in gas pressure and temperature. Another benefit of reducing the supplied pressure at the upstream of the system is that in ultra-high-pressure applications, the control system components do not need to be rated by the compressor's discharge pressure.

Gas Fluid Cooler: A cooler 62 is located after the pressure regulator 60 and before the knockout device 63 to maximize the knockout efficiency.

A knockout filter 63, similar to the knockout filter 16 is installed downstream of the cooler 62. It functions as described above with reference to knockout filter 16.

Optional Heater: A heater 64 is added for applications whose local environments require the buffer gas temperature to be elevated to avoid liquid formation in the buffer stream. It is the equivalent to heating element 22 of FIG. 1.

Optional Gas Booster: A gas booster or intensifier 66 may be added for applications where buffer gas may be necessary for start-up. It is the equivalent to pressure intensifier 20 of FIG. 1.

Liquid Sensor: In accordance with the present disclosure, a liquid sensor 70 is installed adjacent the conditioning system outlet 14 to monitor the performance of the conditioning components. As in FIG. 1, the outlet 14 leads to the seal chambers of the compressor for delivery of clean and dry seal gas upon which the non-contacting seals function.

A liquid sensor 70 is installed at the system outlet 14 which is piped into the compressor buffer supply port. The sensor 70 will monitor the buffers gas condition for any sign of liquid condensate and communicate to an intelligent pre-programmed analyzer (programmable logic controller 130, FIG. 2) to indicate that the buffer gas contains liquid fluid. The programmable logic controller may initiate an output signal 140 on recognition of liquid by the sensor.

The sensor 70 is a custom designed spectral analyzer connected to the system programmable logic controller (computer) 130 via a communication connection illustrated schematically at 80. It effectively monitors the liquid content in the target fluids. The result is a robust sensing technology with a highly variable form factor which can operate at very high temperatures and pressures.

The sensing head is an optical evanescent wave sensor and can detect the presence of liquid in the gaseous flow based on properties of a light beam emitted and received by the sensor. The electronics are UL Class 1 Div 1 approved. The sensing head 70 can be located remotely from the electronics (programmable logic controller 130) via non-conducting fiber optic cable 80 and thus be placed in a completely non-electrified environment, thus enhancing the safety of the device.

On recognition of the presence of liquid in the conditioned seal gas conduit 14 by the optical sensor 70, several alternative responses are contemplated. In one configuration, the programmable logic controller 130 could merely provide an audible or visual signal to alert an operator. Alternatively, the response would include initiation of a detection sequence intended to isolate the cause of the liquid presence. Such sequence would proceed employing pressure and temperature sensors 100 deployed along the conditioning path 14 as described in detail below. Any alternative combination of the monitoring devices, samplings, determinations and responses by the monitoring and control system disclosed herein is contemplated by this disclosure.

Pressure and Temperature Transmitters: In the arrangement illustrated in FIG. 2, in addition to sensor 70, pressure and temperature transmitters or sensors 100 are installed at the outlet of the treatment components, such as the pressure regulator 60, cooler 62, knockout filter 63, heater 64, and intensifier 66. These transmitters or sensors 10 are also connected by a communication path 125 to the programmable logic device 130, and provide input data for determination of the condition of the seal gas in conduit 14 as will be explained.

In accordance with the monitoring and control system of the present disclosure, a number of pressure and temperature sensing transmitters 100 (identified by symbol PTI) are positioned along the flow path of the seal gas treatment arrangement. Such devices are commercially available from Honeywell Corporation and other known sources.

As seen in FIG. 2, a PTI device 100 is positioned downstream of each of the described treatment or conditioning devices including the pressure regulator 60, the cooler 62, the knockout filter 63, and the heater or temperature control device 64. The PTI devices are in communication with programmable logic device 130 (computer central processing unit (CPU)) along a communication path 125. They provide signals of the pressure and temperature of the seal gas at the various locations along the flow path of the seal gas being conditioned prior to delivery to the seal gas chambers of the non-contacting seals of the associated compressor.

Figure 3:
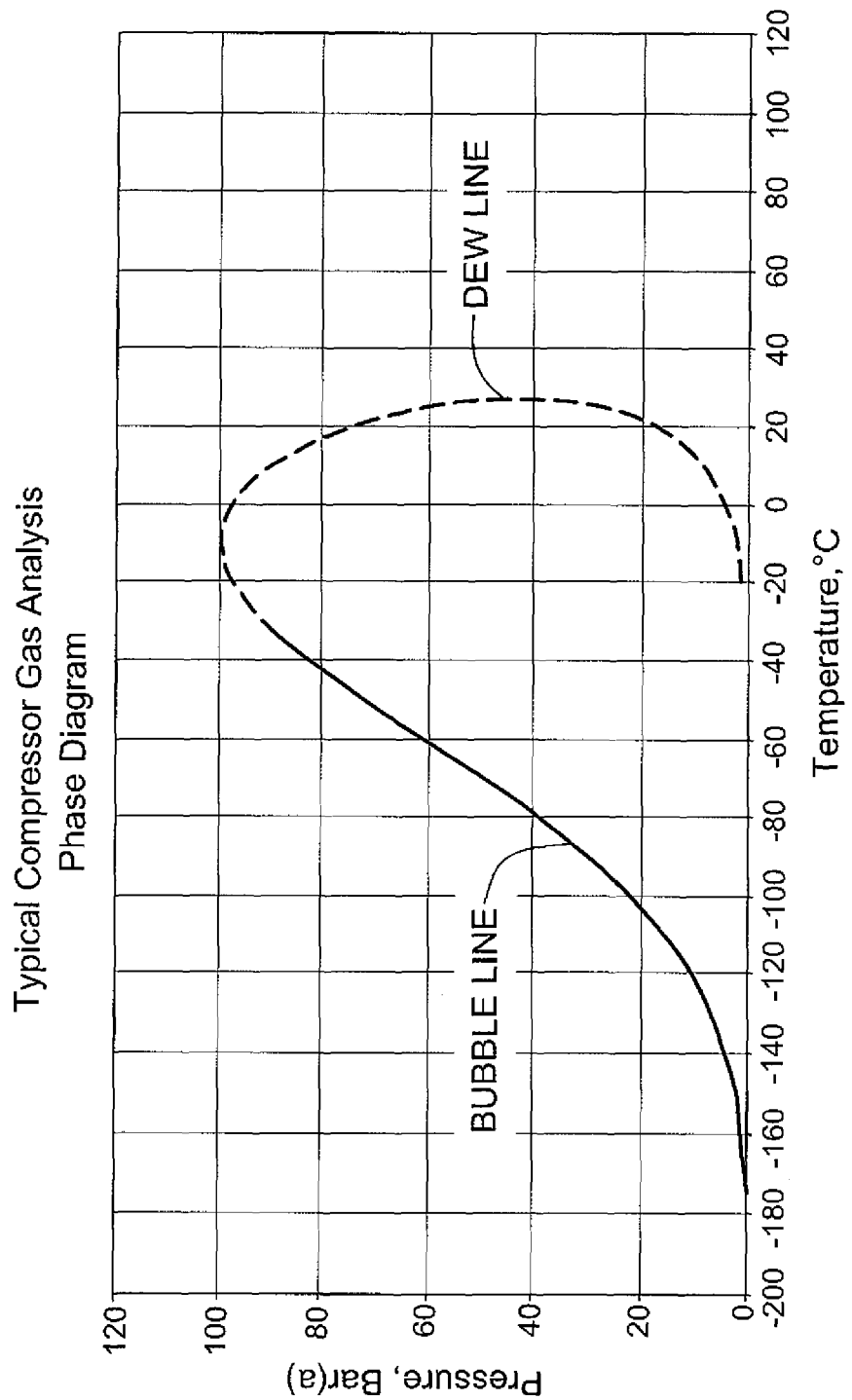
FIG. 3 is a phase diagram for a typical gas compressor process gas.

The sensed data, gas pressure and temperature is useful to recognize the phase condition of the fluid being treated in the seal gas system. FIG. 3 is a gas phase diagram which is illustrative of the phase of a known gas. The programmable logic controller 130 includes machine readable medium or memory which is provided with stored data indicative of the phase of the seal gas at various pressures and temperatures for the composition of the particular gas being processed by the associated compressor. Such stored data is inputted into the machine memory for use by the logic controller to determine the phase of the seal gas fluid flowing at the various locations of the PTI sensors.

In a given gas compressor application the entity operating the equipment is usually cognizant of the make-up of the process fluid. The transmitted product, while 100% gas could, for example, be 80% methane, 15% hydrocarbon, and 5% heavy hydrocarbon. With knowledge of the gas composition, a phase diagram such as illustrated in FIG. 3 can be developed indicative of the phase of the fluid at various pressures and temperatures. For example, with reference to FIGS. 3, the fluid is in a gaseous phase at pressures and temperatures above the dome and in a liquid phase at pressures and temperatures within the dome.

Pre-programmed System Control Box: All signals from the liquid sensor 70 and pressure and temperature transmitters 100 are connected to the programmable logic device 130 (computer or central processing unit (CPU) control box). The CPU identifies the seal gas fluid pressure and temperature at each location of a PTI sensor 100. The logic device makes a comparison to the stored data, for example the phase diagram information illustrated in FIG. 3 for a known gas representative of the process gas. In that way, the logic device determines the presence of liquid concentrate at a given PTI sensor device 100. If liquid is detected the specific signal point, a command is sent by the computer to alert the operator to remedy the condition or take action automatically to avoid dry gas seal exposure to the liquid, which is the leading cause of dry gas seal failures.

The sensed conditions at the pressure-temperature sensing devices PTI(1), PTI(2), PTI(3), PTI(4) is compared to the phase diagram plotted as shown in FIG. 3. The programmable logic controller thus recognizes the status of the gas within the system at each position of the sensors and is programmed to provide an output signal (140). It will recognize a change, including a malfunction of the associated conditioning element; such as the pressure regulator 60, cooler 62, knockout filter 63, heater 64, and intensifier 66. Any disparity between the actual reading and preset gas composition data would be indication of component malfunction or deficiency. This would allow the operator to take appropriate action before the faces are irreparably exposed to liquid fluids.

The output signal from the programmable logic device 130 may be delivered for control purposes in any number of alternative responses. It could provide an alert, sound an alarm, or provide a printed record. In a more comprehensive system, it could cause an automatic response. Such a response could include adjustment of the functioning parameters of one, or more, of the conditioning elements of the system or in case of a need for immediate response, shut down the compressor.

The programmable logic device may also be programmed to make the analysis of the composition of seal gas in the system and recognize deviation from the baseline data. It can then provide an output signal based on such deviation. An example would be in a plant process upset situation.

The seal gas monitoring and control system of the present disclosure is intrinsically safe and provides an advanced warning if any liquid is detected in the seal gas conditioning system. A gas conditioning system includes an optic liquid recognition sensor to sense the presence of liquid vapor or condensate within the seal gas supply to an associated non-contacting gas seal. It is arranged with an intelligent control box to initiate an output signal.

In a conditioning system with one or more conditioning devices, the monitoring system may further include pressure and temperature sensing at the output of each such device. Sensed data is compared to the phase diagram of the known seal gas compatibility to determine whether and when liquid is present. As a result an operator can run a diagnostic check in order to find out the reason for the presence of liquid and initiate an action item before the seal faces are exposed and adversely affected.

The monitoring and control system further includes pressure and temperature sensors downstream of each conditioning unit or element to provide data to the central box on the condition of the seal gas flowing from the associated unit. Through comparison of the received data to stored data on the properties of the gas at various pressures and temperatures, it determines the location of the liquid concentrate. It provides an output signal to initiate appropriate remedial action.

In a configuration contemplated and illustrated by the disclosure and FIG. 2, sensing of liquid at sensor 70 starts a detection sequence involving the PTI sensor 100 downstream of each conditioning unit. The sensed PTI data is received by the computer and compared to the pressure and temperature data stored in the machine readable medium indicative of the phase of the known gas composition at various pressures and temperatures. Thus, the need for adjustment of one or more of the conditioning units, possible process gas upset, or other anomaly, may be isolated as the cause of the liquid phase and an appropriate response taken.

In another particular application, it is contemplated that the seal gas system could include conduit 15 with multiple conditioning elements such as pressure regulator 60, cooler 62, filter 63, etc., with pressure and temperature sensors 100 at the outlet of each such element, but without the sensor 70 in the conduit. In this instance, the programmable logic controller would recognize, and respond only to temperature and pressure data from the sensors 100 and comparison to the stored data of a phase diagram (FIG. 3) for the known process gas.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A monitoring and control system for a non-contacting seal for a gas compressor that compresses a process gas, said seal connected to a buffer gas supply system comprising:
   a conduit having an inlet from a source of the process gas;
   an outlet to a chamber for a non-contacting seal;
   at least one conditioning element between said inlet and said outlet of said conduit;
   said monitoring and control system comprising:

a pressure and temperature sensing device associated with said at least one conditioning apparatus;

a programmable logic controller receiving a signal from said pressure and temperature sensing device;

a source of stored data connected to said programmable logic controller and indicative of the pressure and temperature of the process gas when said process gas is in a liquid and a gaseous state, said programmable logic controller comparing said sensed data with said stored data to determine the condition of the gas at said sensor;

said programmable logic controller sending an output signal in response to recognition of a liquid phase at said sensor.

2. A monitoring and control system for a seal gas supply as claimed in claim 1 wherein said gas supply system includes multiple gas conditioning elements along said conduit, said system further comprising a pressure and temperature sensor downstream of each said gas conditioning element, each said pressure and temperature sensor connected to said programmable logic controller to provide data to said programmable logic controller on the pressure and temperature of the seal gas in said conduit at each said sensor said programmable logic controller determining the phase of the gas downstream of each said conditioning unit by comparing said sensed data with said stored data and providing an output signal on recognition of the presence of a liquid phase at one of said sensors.

3. A method of monitoring and controlling a buffer gas supply system to a non-contacting seal for a gas compressor that compresses a process gas, said gas supply system comprising:

a conduit having an inlet from a source of the process gas;

an outlet to a chamber for a non-contacting seal;

at least one conditioning element between said inlet and said outlet of said conduit;

said monitoring and control system comprising:

a pressure and temperature sensing device associated with said at least one conditioning apparatus;

a programmable logic controller receiving a signal from said pressure and temperature sensing device;

a source of stored data connected to said programmable logic controller and indicative of the pressure and temperature of the process gas when said process gas is in a liquid and a gaseous state, said method comprising:

comparing said sensed data with said stored data to determine the condition of the gas at said sensor; and sending an output signal in response to recognition of a liquid phase at said sensor.

4. A method of monitoring and controlling a buffer gas supply system to a non-contacting seal as claimed in claim 3, wherein said gas supply system includes multiple gas conditioning elements along said conduit, with a pressure and temperature sensor downstream of each said gas conditioning element, each said pressure and temperature sensor connected to said programmable logic controller to provide data to said programmable logic controller on the pressure and temperature of the seal gas in said conduit at each said sensor, said method further comprising:

determining the phase of the gas downstream of each said conditioning unit by comparing said sensed data with said stored data and providing an output signal on recognition of the presence of a liquid phase at one of said sensors.

5. A monitoring and control system for a non-contacting seal for a gas compressor as claimed in claim 1, wherein a liquid sensor is disposed in said conduit between said at least one conditioning element and said outlet to sense the presence of liquid and wherein said liquid sensor comprises an optical device in the form of an evanescent wave device and wherein said optical device is connected to an output device responsive to recognition of liquid present in said conduit at said liquid sensor to provide an output signal.

* * * * *